United States Patent [19]

Mühlenkamp-Becker

[11] Patent Number: 5,028,117
[45] Date of Patent: Jul. 2, 1991

[54] DEVICE FOR GUIDING AND AFFIXING AN ENDOSCOPE

[76] Inventor: Juliane Mühlenkamp-Becker, Im Ruessel 7, 6115 Muenster, Fed. Rep. of Germany

[21] Appl. No.: 515,741

[22] Filed: Apr. 30, 1990

[51] Int. Cl.$^5$ .............................................. G02B 23/26
[52] U.S. Cl. ................................ 350/96.26; 350/96.20
[58] Field of Search .......................... 350/96.20, 96.26

[56] References Cited

U.S. PATENT DOCUMENTS

| | | | |
|---|---|---|---|
| 4,267,828 | 5/1981 | Matsuo | 350/96.26 X |
| 4,620,769 | 11/1986 | Tsuno | 350/96.26 |
| 4,871,229 | 10/1989 | Tashiro | 350/96.26 |
| 4,883,355 | 11/1989 | Saghatchi et al. | 350/96.26 X |
| 4,902,094 | 2/1990 | Shank | 350/96.20 X |

Primary Examiner—William L. Sikes
Assistant Examiner—Phan T. Heartney
Attorney, Agent, or Firm—Walter C. Farley

[57] ABSTRACT

A device for inspecting apparatus from sites of difficult access and comprising inspection apertures for that purpose, for instance aircraft power plants. The device is affixed by a selected adapter, matching the particular inspection aperture and its vicinity, to the inspection aperture through which an endoscope is inserted and, after the desired object of inspection has been found, is affixed.

41 Claims, 4 Drawing Sheets

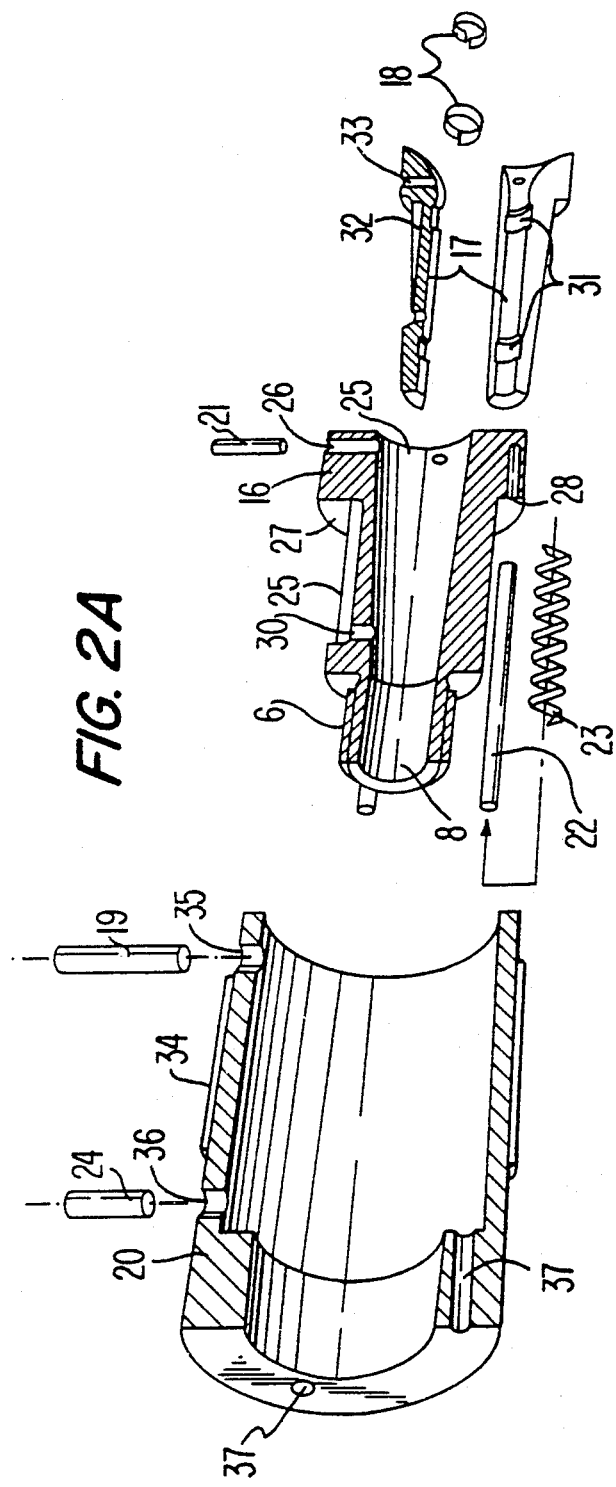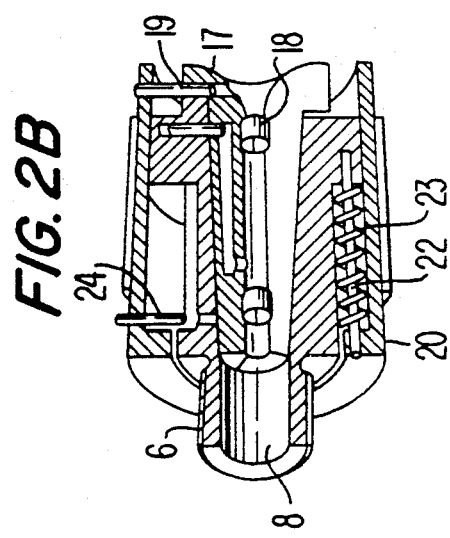
FIG. 2A
FIG. 2B

DEVICE FOR GUIDING AND AFFIXING AN ENDOSCOPE

BACKGROUND OF THE INVENTION

The invention concerns a device for guiding and affixing an endoscope and a matching adapter. This device is technically applicable wherever inspections are required of sites of difficult access such as cavities or machine components by visual examination using an optical means, for instance rigid or flexible endoscopes. This applies in particular to monitoring drive systems of all kinds, especially aircraft power plants, and as regards latter, their blades and combustion chambers.

When inspecting components inside machines, the observer must be able to recognize these components in problem-free manner in order to be able to spot the last damage. This is possible only using a device to guide and affix an endoscope anywhere. The endoscope no longer must be held by the observer.

In order to explain the state of the art, the industrial use of endoscopes will be illustrated with reference to aircraft power plants. At those places of the power plant where provision is made for inspection of the inside, plugs are located in the powerplant casing and are screwed loose; there are also blank flanges of pipe connectors that will be removed.

A rigid or flexible endoscope is inserted through the opening so created, which may assume various diameters, and thereby checking will start. During the entire examination the observer is holding the endoscope and, depending on where he stands or his physical constitution, his body may sway. Ascertained damages must be located again and comparative photographs must be made. The observations so made must be corroborated by other expert person(s).

Optimal observation is impossible because the endoscope is held freely while the body may sway. It must be made possible to the observer to assure problem-free recognition of the components over the entire distance between the close and far recognition points without himself having to hold the endoscope. Only in this manner shall it be possible to discover the tiniest damages and relocate them again. Work based on the present state of the art is highly time-consuming and hence expensive, moreover endoscopes are frequently damaged and as a result cause longer inspection times and also substantial costs for repairs or new acquisitions of endoscopes. Endoscopes incur damage by being tilted in the inspection aperture and by being moved over its sharp-edged threads. The optics is often damaged by hitting the edge of this inspection aperture.

Where second or third persons are involved, it is time-consuming and difficult to relocate previously ascertained damages because other angles of view and hence observed scenes follow from the free holding of the endoscope. Where comparison photographs must be take, the cost in time increases because the endoscope is not fixed in place and blurred images arise from motion. In that case the endoscope most of the time will be tilted to prevent it from moving.

Known devices for guiding an endoscope are for flexible ones and no longer are used in the present generation of powerplants.

U.S. Pat. No. 4,298,312 and also British patent 20 33 973A describe a device with a tubular segment of present curvature through which an endoscope may be moved but cannot be affixed.

These known devices are applicable only to special cases.

The same condition holds for the German patent document 37 07 368 A1 with the assembly plate described therein with the holding elements for a guiding tube.

That invention entails another drawback, namely that depending on the application, the stop means and joints and the many connections by clamps require substantial set-up time and following frequent use, they will convert the individually applied forces into device damage.

The object of the British patent 20 33 973 A suffers from the further drawback that the guide tube is axially displaced by a screw and therefore there is no possibility of rotating the tube and hence the endoscope; moreover the affixing of the tube by a further screw acting on the outer tube ipso facto damages same and thereby axial displacement is hampered where not impossible.

In the U.S. patent mentioned above, the flexible endoscope is not held in the tube and therefore must be corrected when the tube is axially displaced.

SUMMARY OF THE INVENTION

The object of the invention is to assure and improve problem-free observation of inner machine parts by means of rigid and flexible endoscopes; further to lower the damage frequency to endoscopes to a minimum and to obtain problem-free pictures by means of an affixed endoscope, either by direct observation or by photography, video recording or a monitor, and further to shorten the duration of inspections and to reduce the overall costs, and to make possible rapid, problem-free and practical endoscopy through the inspection apertures using adapters matching the applications.

Briefly described, the invention comprises a device for guiding and affixing an endoscope when inspecting sites which are difficult to access in apparatus comprising inspection apertures for that purpose, in particular for inspecting aircraft powerplants. The device includes a guidance unit with a cylindrical through-bore which can be fastened by an adapter to the apparatus being checked and mechanical means to affix the endoscope in a selectable position. The guidance unit comprises a clamp designed as a hollow-cylindrical rubber spring and fitted into a widened region of the cylindrical bore of the guidance unit and being compressible by means of an axially displaceable device.

Preferred further embodiments of the device of the invention with the required adapters are stated in the dependent claims. In special cases the device may be an integrated component of the machine or plant and assume simultaneously sealing tasks. Moreover the required adapter may be integrated into the device defined above. When the device is mounted vertically, for instance in the inspection of a combustion chamber of an internal-combustion engine such as are being used in passenger cars, a subsequent adapter may hold the endoscope in order to prevent this endoscope after being free from dipping into the above device and thereby to make possible endoscope rotation above the fixed height by 360°.

A quick-connect with conditional inhibition of rotation allows device rotatability including the affixed endoscope in the adapter and thereby makes possible retaining the desired position of the rotated endoscope. A groove in the device, to guide and affix an endoscope and continuing in the subsequent adapter and made flush by a bayonet coupling, allows introducing a plastic tube parallel to the endoscope to carry out a clean check.

The advantages offered by the invention in particular are that the device together with the corresponding adapters, may be used for rigid and flexible endoscopes,
are applicable universally for any design of inspection aperture,
are free of complexity and quickly manoeuvered,
are rugged and thereby safe against external factors that might lead to malfunctions,
permit axially displacing the endoscope which is guided with minimal tolerances to the point of observation with rotation possible at the same time,
will affix an endoscope by means of a large clamping area with corresponding large holding forces,
will prevent shifting of the angle of view by unintended forces acting on an affixed endoscope, and
allow carrying out inspections in time-saving manner.

Further advantages are that the device of the present invention permits affixing the endoscope to a particular point of observation. Thereby accurate observation and monitoring is assured for the first time. If such components as turbine blades for instance are made to pass-by the affixed end of the endoscope, the observer shall see the same pictures and accordingly any deviation from the previously observed shall at once be detected.

Once there is an affixed endoscope, reliable observation can be carried out by an observer using a monitor and controlling the sharpness (contrast) of the endoscope, i.e., of the picture.

Then pictures of the condition also are fixed and allow better evaluation of damage to components. Thereby—where recordings are concerned—one has eliminated the time-consuming relocation, and the need for additional persons necessary for assessments. Damage to the endoscope from handling is substantially eliminated because the endoscope is inserted into the device of claim 1 through an integrated funnel. Tilting inside the inspection aperture is averted by affixing the endoscope, and this is also the case when the endoscope is being moved ahead during the observation stage, since now uncontrolled observer motion is eliminated by the guidance function of the device. The duration of inspection at the object and also costs of repairing damaged endoscopes are substantially reduced.

BRIEF DESCRIPTION OF THE DRAWINGS

Illustrative embodiments of the device of the invention are elucidated below in relation to the drawings wherein;

FIG. 2A is an exploded perspective view, in longitudinal section, of a further embodiment of a device according to the invention;

FIG. 2B is an assembled sectional view of the embodiment of FIG. 2A;

DESCRIPTION OF THE PREFERRED EMBODIMENTS

Figure 1A:
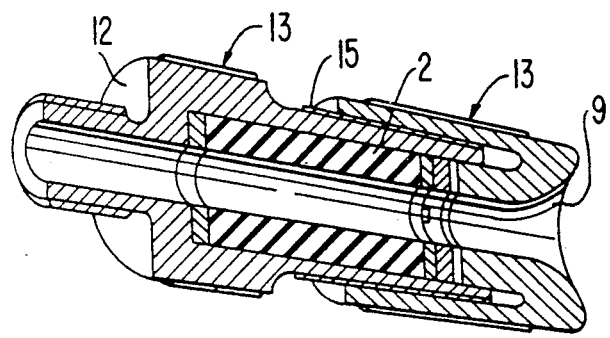
FIG. 1A is a perspective view, in longitudinal section, of an assembled device according to the invention.
Figure 1B:
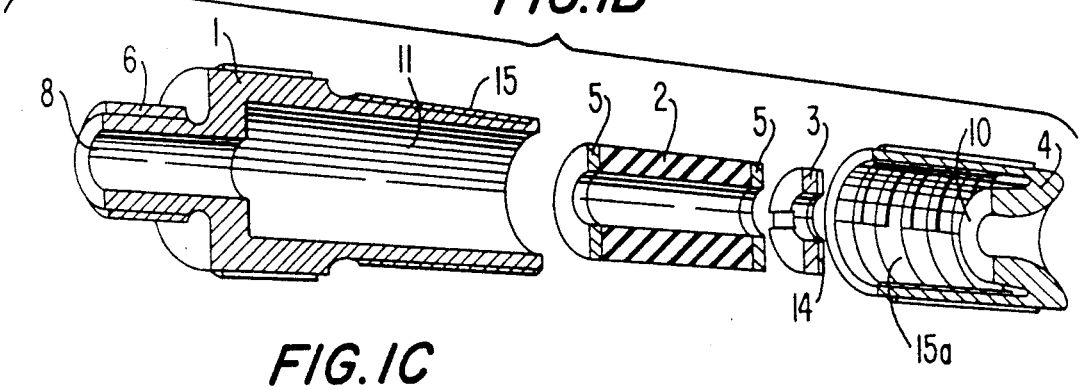
FIG. 1B is an exploded perspective sectional view of the devices of FIG. 1A.
Figure 1C:
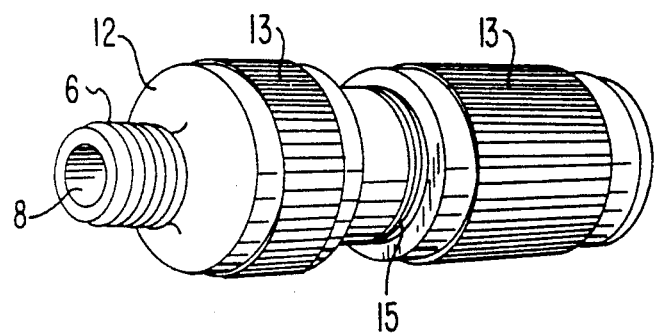
FIG. 1C is a perspective view of the assembled device of FIGS. 1A and 1B.

FIGS. 1A-1C show a device for guiding and affixing an endoscope. This device comprises a guidance unit 1, a clamp 2 with metal washers 5 mounted to its ends, a thrust washer 3 and an axially displaceable shell 4. The guidance unit 1 is provided with a seat 6 for adapters. In this embodiment the seat 6 comprises an external thread corresponding to the plug of the most commonly used inspection aperture which closes a machine, whereby the device also may be used without an adapter. Be it borne in mind that a variation of this embodiment calls for the seat 6 being the matching part of a bayonet or a quick-connect. This applies also to the illustrative embodiments described below of device and adapter.

The seat 6 is part of the guidance unit 1 and its diameter is less than that of the next part of the guidance unit 1. This produces an offset forming an axially facing rest surface 12 which extends toward the larger diameter and bounding the depth of threading. In the next part the guidance unit 1 comprises a knurled surface 13 and a fine thread 15 beyond a projection in its end part to seat the axially displaceable device 4. The guidance unit 1 is provided with a cylindrical stepped bore, with the smaller bore 8 corresponding to the largest of the outer diameters of the applicable endoscopes and, following an abrupt transition, to a bore part 11, corresponding to the outside diameter of the clamp 2 with its metal washers 5, provision being made that the tolerances allow for play. The entire bore is burnished. The larger bore part 11 of the guidance unit 1 seats first the clamp 2 with its externally burnished metal washers 5 bonded or vulcanized to the ends of the clamp and then the thrust washer 3. The clamp 2 comprises an elastomeric such as a rubber resistance to kerosene and oil, preferably an acrylonitrile butadiene rubber, and assumes the shape of a hollow cylinder. The inside diameter of the unstressed clamp 2 and of the metal washers 5 matches that of the bore 8. The inside diameter of the clamp 2 inclusive the metal washers 5 may vary according to a predetermined offset in relation to the shore hardness of the clamp and the outside diameter of the endoscope being used, so that the clamps are characterized by different colors to display those deviations. A possible reducing part made of plastic matching the funnel-shaped endoscope insertion opening 9 of the axially displaceable device 4 and the inside diameter of the clamp 2 being used, is made with the same color as the clamp coding and may be slipped onto the axially displaceable device 4.

The thrust washer 3 is made of a sintered metal and its outside/inside diameters match those of the clamp 2 having the largest inside diameter. The thrust washer 3 is formed at its top and bottom sides with grooves 14 extending radially over the entire width but mutually offset by 90°.

The axially displaceable device 4 is provided at tis front with an inside thread 15 a matching thread 15 on the outside of the guide unit 1 and, by means of this thread, can be moved axially. A funnel-like part 9 at the end and tapering from the outside to the inside merges into a through-bore of the same inside diameter as that of the previously described parts 3, 2, 8. The exit from this through-bore is at a burnished pressure surface 10 acting on the thrust washer 3 and of the same outside diameter. The outside diameter of the axially displaceable device is constant and has a knurled part 13 which corresponds to that of the guidance unit 1. The surface is knurled over a restricted area. By shifting the device 4 on the thread of the guide unit 1, and in a predetermined direction, the clamp 2 is compressed or relieved by means of the thrust washer 3 and thereby changes its inside diameter. An endoscope inserted through the funnel-like opening 9 of the axially displaceable device and through the subsequent borehole can be moved to-and-fro to locate the observation point while being guided with little diameter tolerance relative to the clamp 2, or its enclosed by this clamp and hence fixed in place.

The components of the above described device and adapter as well as those of the embodiment below shall be made of corrosion-proof materials or be provided with corrosion-proof coating such as Eloxal [anodized coating].

FIGS. 2A and 2B show another illustrative embodiment of the device of the invention for guiding and affixing an endoscope.

The device consists of a guidance unit 16 with a seat 6 for the adapter, three spring guides 22, the associated helical springs 23, a clamp consisting of three segments 17, two expansion springs 18, three drive pins 19, three guidance pins 21 and a fixation pin 24.

The guidance unit 16 comprises a through-bore. This through-bore 8 is cylindrical in the area of the adapter seat 6, but then merges into a conical part 25 extending as far as the exit at the insertion side of the clamp.

In this area too there is the largest outside diameter of the guidance unit 16, said diameter being stepped toward the seat 6 for the adapter. Bores 26 equidistant from the sealing surface and 120° apart start from this diameter, issuing in the burnished conical inner bores 25. The end surface 27 between the largest diameter portion and the next stepped smaller diameter comprises blind holes 28 which are 120° apart. The rod-like spring guides 22 made of hardened steel are forced into these blind holes 28. The helical springs 23 are compressed to move onto the spring guides 22.

That part of the guidance unit 16 formed by the smaller outside diameter comprises a groove 29 at its surface which is offset by 60° from one of the blind holes 28.

This groove extends from the end face 27 to nearly the beginning of the next step following the seat 6 for the adapters. At this site there is a through-bore 30 in the groove, issuing into the conical inner bore 25 and which serves in dismantling the fixation pin 24 of the axially displaceable device 20. The equal segments 17 made of a non-metallic material form the clamp which in this case comprises a cylindrical borehole widening like a funnel at the endoscope insertion side. Two annular grooves 31 inside the bores receive the annular expansion springs 18 consisting of leaf-spring steel the ends of which overlap even when the spring is maximally extended. The grooves 31 are such that the entire spring, including the overlapping parts of the expansion springs 18 are released in the grooves. On the outside the clamp is provided with a conical slope matching the conical inside bore 25 of the guidance unit 16 and by means of a step terminates in a cylindrical part.

In clamp parts 17 are located boreholes 33 at 120° to each other and equidistant to the outer edge, namely one per segment center, which issue into the funnel-like exit of the clamp. Longitudinal grooves 32 are present at the segment centers in the conical outer part of the clamp and at 120° to each other, the bottoms of said grooves being parallel to the cylindrical inner bore. The grooves 29 serve to guide the segments and match by their lengths the smallest/largest inside diameters of the clamp resulting from displacement.

The clamp or its segments 17 with the expansion springs 18 are inserted into the conical part of the bore 25 of the guidance unit 16. The guidance pins 21 are pressed so far into the bore 26 of the guidance unit 16 that some play remains relative to the bottom of the groove 32 in the segments 17 of the clamp. The grooves 32 are somewhat wider than the diameter of the guidance pins 21 such that the pins have some play and permit shifting the segments 17.

The axially displaceable device 20 comprises a continuous bore with offset inside diameters. At the endoscope insertion side that bore corresponds to the largest outside diameter of the guidance unit 16; at the adapter side, it corresponds to the stepped outside diameter in which grooves 29 of the guidance unit 16 are formed. The bores are made to fit with play and are burnished. The outside diameter of the axially displaceable device 20 is constant. The surface is provided with knurling 34 over a limited area.

Through-bores 37 parallel to the axis but mutually offset by 120° are present at the adapter side starting at the end face of the axially displaceable device 20. The through-bores 37 serve to guide the spring guides 22. Axially toward the insertion end and offset by 60° relative to the end-face bores 37 there is a bore 36 from the surface which issues into the larger inside diameter section and receives the fixation pin 24. Another three bores 35 are present in the end part which are mutually offset by 120° and equidistant to the outer edge: they receive the drive pins 19.

The axially displaceable device 20 is moved over the guidance unit 16. The spring guides 22 are provided with a matching rest with play in the bore 37. The fixation pin 24 is pressed into the bore 36 to an extent that play remains relative to the bottom of the groove 29 in the guidance unit 16. Next the drive pins 19 are forced into the bores 35 of the axially displaceable device 20 and are received with play by the bores 33 of the segments 17 of the clamp.

If now the axially displaceable device 20 is moved in a predetermined direction, it shall be secured against rotation by means of the groove 29 of the guidance unit 16 and the fixation pin 24. The drive pins 19 transmit the relative motions of the axially displaceable device 20 by means of the bores 26 to the clamp segments 17.

When the device of the invention is affixed, with or without adapter, to an inspection aperture and when en endoscope with least or largest diameter is inserted into the funnel-like opening of the clamp segments 17 while the axially displaceable device 20 is fully withdrawn, the axially displaceable device 20 is moved forward by the holding pressure yielding and by the force of the helical springs 23, then the clamp segments 17 are driven along, the inside diameter of the clamp is reduced and matches that of the endoscope which, with little diameter tolerance relative to the clamp, can be guided to move to-and-fro to locate the observation point. Upon releasing the axially displaceable device 20, the helical springs 23 apply a corresponding compression to the axially displaceable device 20 and thereby, by means of the drive pins 19, to the clamp segments 17 which then enclose the endoscope with a corresponding force, fix it in its position and prevent shifting.

Figure 3:
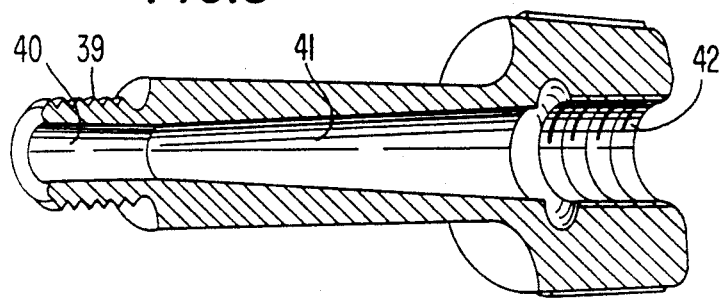
FIG. 3 is a perspective sectional view of an adapter in accordance with the invention.
Figure 4:
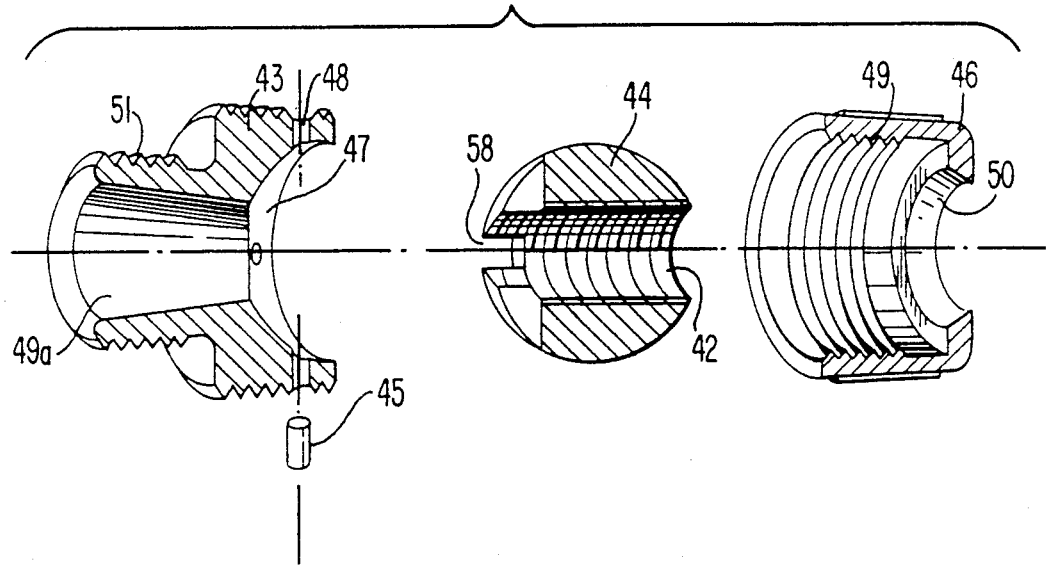
FIG. 4 is an exploded perspective sectional view of a further embodiment of an adapter in accordance with the invention.
Figure 5:
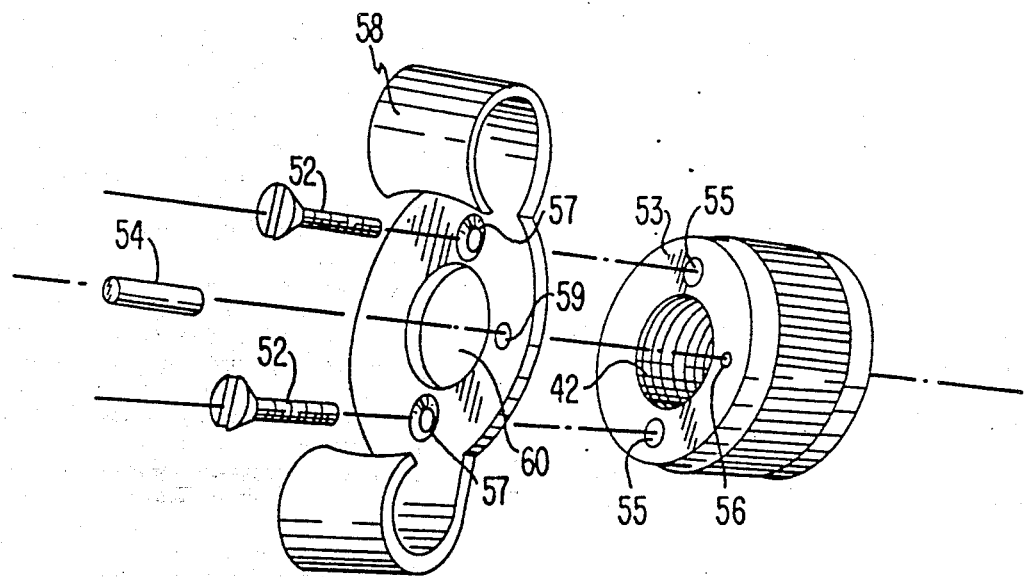
FIG. 5 is an exploded perspective view of a still further embodiment of an adapter in accordance with the invention.

FIG. 3, 4 and 5 show illustrative embodiments of adapter in accordance with the invention used in relation with the device for guiding and affixing an endoscope shown in FIGS. 1A-1C or 2A, 2B.

FIG. 3 is an embodiment in the form of one integral part and comprising both stepped diameters and a through-bore 8. The largest diameter corresponds to the device of the invention shown in FIGS. 1A-1C or 2A, 2B and is constant over the length of the coupling for this device. The surface of this part is knurled. The next and offset part is such that it matches, in length and diameter, the particular vicinity of the inspection aperture, that is, the adapter of the present invention may assume several embodiment modes. The next stepped part is provided with a thread 39 corresponding to threads in the applicable inspection aperture. In this case as well as regarding the other embodiments, any design matching the particular inspection aperture is conceivable. The bore 40 in this part is cylindrical and extends next through the length of the central part in the form of a conically flaring bore 41 as far as the transition to the coupling shown here with an inside thread 42. In this case the adapter is made of a high-strength, tough material for the application to the smallest inspection aperture together with the largest likely endoscope diameter.

FIG. 4 shows a further embodiment of an adapter of the invention. This adapter consists of a guidance housing 43, a swivel-joint ball 44, a fixating pin 45 and a cap means in the form of an axially displaceable device 46. The guidance housing 43 comprises stepped outside diameters. The part with the smaller diameter on the inspection side is matched to the inspection apertures.

The next adjacent part with a larger diameter is provided with a fine thread to seat the axially displaceable cap means device 46. The conical bore 49a through the guidance housing 43 terminates by its smaller diameter in a burnished spherical socket 47 seating the swivel-joint ball 44. Four boreholes 48 offset from one another by 90° and equidistant from the edge start at the periphery and issue in the socket. Fixating pins 45 are pressed into said boreholes 48 and slightly project into the spherical socket 47. The swivel-joint ball 44 comprises a through-bore having an internal thread 42 or matching the coupling of the device of the invention of FIGS. 1A-1C or 2A, 2B. That part of the swivel-joint ball 44 which is received by the spherical socket 47 of the guidance housing 43 comprises four end-faced millings 58 mutually offset by 90° of maximum width and entered by the fixating pins 45. The depth of the millings is such that a predetermined maximum adjustment angle of the swivel-joint ball 44 is determined by the fixating pins 45 of which one rests against the end of one of the grooves. The swivel-joint ball 44 is made of a wear-resistant material of low friction, or coated with it. The axially displaceable device 46 matches by its outside diameter that of the device of the invention shown in FIGS. 1A-1C or 2A, 2B and comprises a knurling 49 at its periphery over a restricted area. Part of the through-bore is finely threaded so that the axially displaceable device 46 can be moved over the outside thread of the guidance housing 43. Following an undercut there is a burnished spherical socket 50 providing the matched bearing of the swivel-joint ball 44 to the spherical socket 47 of the guidance housing 43, whereupon the through-bore issues at the end of the axially displaceable device 46. If the axially displaceable device 46 is moved in either direction, the swivel-joint ball 44 may be moved or shall be fixed.

In conjunction with the device of the invention of FIGS. 1A-1C or 2A, 2B being mounted at an inspection aperture, this device may be pivoted over a limited range, that is, a rigid endoscope will allow a wider field of inspection and furthermore the endoscope may be affixed to this area at a given pivot angle.

FIG. 5 shows an illustrative embodiment of the adapter of the invention which permits inspecting inside spaces through detached tube or pipe connections. The adapter consists of an elastic clasp 58, connectors 52, a coupling 53 and a fixating pin 54. The coupling 53 is cylindrical and is provided with knurling at its surface over a limited area. The outside diameter corresponds to that of the device of the invention of FIGS. 1A-1C or 2A, 2B. The surface subtended by the inside diameter is fitted with threads 42 or is designed in relation to the coupling of the device of the invention of FIGS. 1A-1C or 2A, 2B. Two mutually opposite blind-hole threads 55 extend in the axial direction and at 90° offset from them there is a bore 56 to receive the fixation pin 54. The bore 56 and the fixation pin 54 are so matched that after the fixation pin 54 has been pressed-in, it shall project by the thickness of the sheetmetal of the elastic clasp 58. The elastic clasp 58 is made of leaf-spring steel. The central part is matched to the outside diameter of the coupling element 53 and comprises boreholes 57, 59 aligned with those of coupling 53. The bores 57 comprise countersinks.

The central bore 60 is somewhat larger than that of the coupling 53. Mutually opposite legs of the same width bu narrower than the central part start from this central part. The legs end are bent by about 225°. The inward drawn part is shaped in such manner—taking into account prestressing which may effect the sheetmetal thickness—that the curvature of the tube surface matches that of the tube end serving as the inspection aperture. The elastic clasp 58 comprises punched numerals corresponding to the tube or pipe diameter for its application, i.e., elastic clasps 58 for different pipe diameters can be connected by the connection elements 52, two countersunk screws, with the coupling 53. The invention of the adapter with the device of FIGS. 1 or 2 now can be slipped by its bent ends onto a pipe end serving as the inspection aperture until it areally rests with the elastic clasp 58 against the pipe end. The pre-stressed elastic clasp 58 applies sufficient pressure on the pipe surface so that the unit shall be firmly affixed. The bent ends are pulled apart against the spring force when the adapter shall be removed from the pipe and the unit then will be removed.

I claim:

1. A device for guiding and holding an endoscope to inspect interior sites in apparatus having inspection apertures comprising
   a guidance unit having means defining a central generally cylindrical through-bore with an inner surface;
   means for attaching said guidance unit to an apparatus being inspected with said central through-bore aligned with an inspection aperture therein; and
   means for clamping an endoscope in said guidance unit, said means for clamping including an elongated tubular elastomeric spring member in said through-bore, said spring member having a generally cylindrical outer surface adjacent said inner surface of said through-bore and a generally cylindrical inner surface having a diameter greater than an endoscope to be inserted therein, and means for axially compressing said spring member with the outer surface thereof confined by said inner surface of said through-bore to thereby decrease the diameter of said inner surface so that said inner surface can engage and clamp an endoscope inserted therein.

2. A device according to claim 1 wherein said through-bore includes a first generally cylindrical portion having a first diameter larger than the diameter of the largest endoscope to be used and a second generally cylindrical portion having a second diameter larger than said first diameter, said second portion receiving said spring member.

3. A device according to claim 2 wherein said guidance unit includes an outer cylindrical threaded surface and an insertion end, and said means for compressing includes an axially displaceable body having an internally threaded portion threadedly engaging said outer cylindrical threaded surface so that said axially displaceable body is displaced by rotation relative to said guidance unit.

4. A device according to claim 3 wherein said axially displaceable body includes a cylindrical bore therethrough, a burnished funnel-like endoscope insertion opening merging into said cylindrical bore therethrough and a compression surface axially opposite said endoscope insertion opening.

5. A device according to claim 4 wherein said means for clamping includes a thrust washer at an end of said spring member adjacent said compression surface, said compression surface acting against said thrust washer to compress said spring member when said axially displaceable body is displaced to move said compression surface into said guidance unit.

6. A device according to claim 5 wherein said thrust washer is made of a sintered metal.

7. A device according to claim 5 wherein said thrust washer includes means defining a radially extending groove on each side thereof, said grooves being mutually displaced by 90°.

8. A device according to claim 1 wherein said spring member is made of acrylonitrile butadiene rubber.

9. A device according to claim 8 and further comprising a metal washer at each end of said spring member.

10. A device according to claim 9 wherein the inner diameter of said spring member when uncompressed is selected to substantially match the external diameter of an endoscope to be used.

11. A device for guiding and holding an endoscope to inspect interior sites in apparatus having inspection apertures comprising a guidance unit having means defining a central through-bore with an inner surface including a conical surface portion enlarging toward an insertion end of said guidance unit;

means for attaching said guidance unit to an apparatus being inspected with said central through-bore aligned with an inspection aperture therein; and means for clamping an endoscope in said guidance unit, said means for clamping including a plurality of arcuate segments having tapered outer surfaces in said conical surface portion and having semi-circular inner surfaces which, together, define a generally cylindrical central bore, and axially displaceable means for axially moving said arcuate segments relative to said conical surface portion to thereby change the diameter of said generally cylindrical central bore defined by said inner surfaces of said segments so that said inner surfaces can engage and clamp an endoscope inserted therein.

12. A device according to claim 11 and further comprising expansion springs urging said segments against said conical surface portion.

13. A device according to claim 12 and including pins coupling said segments to said axially displaceable device for axial movement therewith.

14. A device according to claim 13 wherein each of said segments includes an axially extending groove in said outer surface thereof, said device further comprising guide pin means carried by said guidance unit an extending into said axially extending grooves for maintaining the displacement axis of said segments.

15. A device according to claim 14 wherein the ends of said segments facing in the same direction as said insertion end of said guidance unit are shaped to form a funnel-like insertion opening.

16. A device according to claim 14 wherein said segments are made of a non-metallic material.

17. A device according to claim 14 wherein said guide pin means are rigidly attached to said guidance unit.

18. A device according to claim 11 wherein said guidance unit has an outer surface with generally cylindrical portions having different diameters including a portion at the insertion end having the largest diameter, a portion at the opposite end having the smallest diameter and the intermediate portion having an intermediate diameter.

19. A device according to claim 18 wherein a generally transverse surface between the largest diameter portion and said intermediate diameter portion includes means defining a plurality of axial bores, each bore carrying one end of an axially extending spring guide, and further comprising helical compression springs surrounding said spring guides.

20. A device according to claim 19 wherein said axially displaceable means surrounds and slides on said largest diameter portion of said guidance unit.

21. A device according to claim 20 wherein said intermediate diameter portion of said guidance unit includes means defining an axially extending guide slot circularly offset from said spring guides.

22. A device according to claim 21 and further comprising a fixating pin attached to and carried by said axially displaceable device and extending into said guide slot to prevent relative rotation between said axially displaceable device and said guidance unit.

23. A device according to claim 19 wherein said helical springs urge said axially displaceable device toward its initial position relative to said guidance unit.

24. A device according to claim 23 wherein said axially displaceable device includes an end wall having openings therein to receive the other ends of said spring guides.

25. A device according to claim 1 or 11 wherein said means for attaching said guidance unit to an apparatus to be inspected includes an adapter body comprising
means defining a bore therethrough;
means for attachment to said guidance unit; and
means for attachment to an inspection aperture in said apparatus to be inspected.

26. A device according to claim 25 wherein said means for attachment to said guidance unit includes a swivel-joint ball movable about horizontal and vertical axes relative to said body and cap means for holding said ball in position.

27. A device according to claim 25 wherein said inspection aperture comprises a pipe end and wherein said means for attachment to said inspection aperture includes pipe clip means for attachment to said pipe end.

28. A device according to claim 27 wherein said pipe clip means comprises an elastic C-shaped clasp.

29. A device according to claim 28 wherein said elastic clasp comprises a passage hole substantially matching said bore through said adapter body, two fastener holes in said clasp and body for receiving fasteners and a bore hole in said clasp and body for receiving a fixation pin to attach said clasp to said body.

30. A device according to claim 29 wherein said fasteners are removable.

31. A device according to claim 25 wherein said guidance unit includes a threaded end portion for connection to an adapter.

32. A device according to claim 25 wherein said guidance unit includes a bayonet connector for connection to an adapter.

33. A device according to claim 25 wherein said guidance unit includes a quick-disconnect end portion for connection to an adapter.

34. A device according to claim 26 and including fixating pins to limit pivoting to said ball to a predetermined motion range.

35. A device according to claim 34, wherein said swivel-joint ball includes means defining guidance grooves for receiving said fixating pins.

36. A device according to claim 34 wherein said fixating pins are rigidly attached to said body.

37. A device according to claim 26 wherein said ball has an outer surface comprising a material with long-term low-friction properties.

38. A device according to claim 26 wherein said body and said cap means form matching bearing seats for said swivel-joint ball.

39. A device according to claim 26 wherein said means for attachment to said inspection aperture comprises an affixing device matable with said inspection aperture and the body portion of said adapter adjacent said affixing device is externally threaded.

40. A device according to claim 39 wherein said cap means is internally threaded to match said external threads on said body portion adjacent said external threads on said body portion adjacent said affixing device, and wherein said cap means is axially movable by rotatably threading said cap means.

41. A device according to claim 1 or 11 having an outer surface which is corrosion-resistant.

* * * * *